Nov. 6, 1945.   L. C. STEINLE ET AL   2,388,503
SHAFT BEARING
Filed Feb. 15, 1943

Inventors
L. C. Steinle
C. H. Hanwell
By Glascock Downing Suhrle
attys.

Patented Nov. 6, 1945

2,388,503

UNITED STATES PATENT OFFICE 2,388,503

SHAFT BEARING

Leo Caspar Steinle, Wimbledon, London S. W. 19, and Cedric Harold Hanwell, Cogenhoe, England Application February 15, 1943, Serial No. 475,996
In Great Britain March 25, 1942

3 Claims. (Cl. 308—22)

This invention relates to shaft bearings and more specifically to outboard support bearings.

Certain forms of machines embody shafts extending for one reason or another to an appreciable extent beyond the bearings proper, the extended portion being provided with an outboard bearing and support therefor, which bearing and support are removable to enable access to be had to a member, e.g. a thread-generating roller, replacement of which latter may be required.

It is necessary in many cases when replacing the bearing and support to set the bearing with great accuracy in relation to the shaft in order to preserve a high degree of accuracy in action—an operation entailing skill and often the expenditure of much time.

The object of the present invention is to provide means for ready detachment and replacement of an outboard bearing and its support in accordance with which the original adjustment of the bearing is automatically restored on replacement.

The invention in brief consists in a readily detachable bearing support for an outboard portion of a shaft comprising a fixed support, adjustable abutment members, means for securing said abutment members rigidly in relation to said fixed support, a head, a plurality of freely rotatable rollers on said head, readily mountable and demountable means, disposed between said securing means, for holding said head rigidly against said abutment members with said rollers engaging and supporting said shaft portion.

Figure 1:
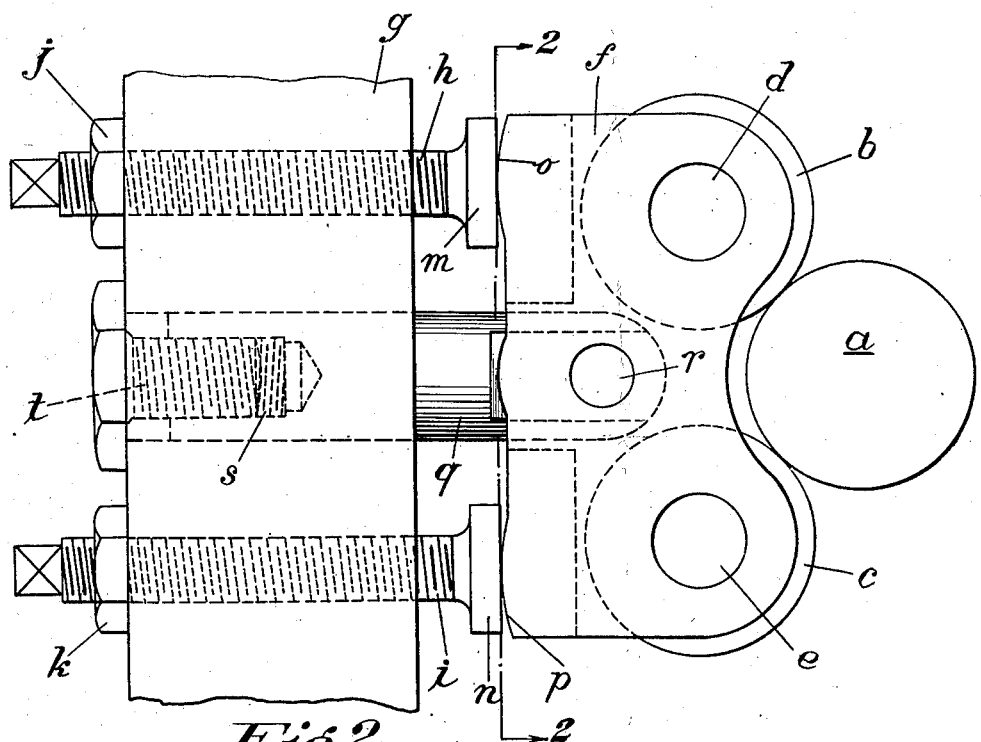
Fig. 1 is a diagrammatic end view of a shaft furnished with an outboard bearing support device in accordance with the present invention and with the device shown in side elevation.
Figure 2:
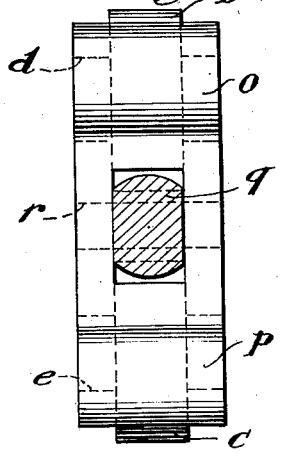
Fig. 2 is a transverse sectional view on a reduced scale, taken on the line 2—2 of Fig. 1.

In carrying the invention into effect in the form illustrated by way of example in the accompanying drawing, as applied to an outboard bearing for steadying a fixed-axis roller die in a screw-thread generating machine, we provide for the outboard portion of the fixed axis die shaft $a$ a pair of rollers $bc$ mounted on pivots $de$ carried in a bearing support, which bearing support comprises a carrier member or head $f$ adapted to be secured firmly in relation to the fixed support $g$ of the machine.

Interposed between the support $g$ and the bearing head or carrier $f$ a pair of screws $hi$ are provided both with locknuts $jk$, the heads $mn$ of the screws forming abutments for curved portions $op$ formed on the adjacent surfaces of the head $f$.

A drawbolt is provided comprising a plunger $q$ adapted to pass freely through a hole in the support $g$ and having a laterally drilled hole at the end of the plunger for the reception of a pin $r$. This end of the plunger $q$ is adapted to enter freely a hole formed in the head $f$ and to be brought into a position in which the lateral hole in the plunger is in alignment with the lateral hole in the head through which the aforesaid pin may be inserted. The opposite end of the plunger is furnished with an internally screw-threaded bore $s$ for the reception of a screw $t$ by means of which the plunger may be drawn towards the support so as to draw the curved surfaces $op$ of the head firmly against the heads of the adjustment screws $mn$.

In operation the carrier or head is adjusted in position so that the bearing rollers $bc$ correctly engage the outboard end of the roller die shaft $a$, this being set by means of the adjustment screws $hi$ which are finally locked in position and the screw $t$ of the plunger tightened.

In order to remove the bearing and head it is merely necessary to slacken the plunger screw $t$, to withdraw the crosspin $r$ whereupon the plunger $q$ may be moved longitudinally, i. e. perpendicular to the axis of the shaft $a$ and thus withdrawing the plunger from the hole formed in the head thereby enabling the head to be removed from the machine by movement in a direction parallel to the axis of the shaft $a$.

Replacement of the head involves merely its being moved into position, the plunger moved longitudinally, the crosspin inserted and the plunger screw tightened; the original adjustment of the bearing in relation to the roller die shaft is thus restored without recourse to any alteration of the adjustment screws.

A similar arrangement may be provided for the movable axis roller die shaft, but in this case the adjustment screws and drawbolt screw are conveniently fitted to a rigid pillar forming part of the slide carrying the main bearings of this roller die shaft.

We claim:

1. A readily detachable bearing support for an outboard portion of a shaft comprising a fixed support, adjustable abutment members, means for securing said abutment members rigidly in relation to said fixed support, a head, a plurality of freely rotatable rollers on said head, readily mountable and demountable means, disposed between said securing means, for holding said head rigidly against said abutment members with said rollers engaging and supporting said shaft portion.

2. A readily detachable bearing support as claimed in claim 1 wherein said adjustable abutment members comprise a pair of screws with lock nuts fitted to the said fixed support and said means for urging said head into operative association with said adjustable abutment members comprise a plunger urged longitudinally by a screw engaging an internally screw-threaded bore in said plunger, said plunger being disposed between said adjustable abutment members.

3. A readily detachable bearing support as claimed in claim 1, wherein said head is furnished with a lateral bore for the reception of a detachable pin and the said fixed support is furnished with a bore for receiving a screw-threaded plunger furnished with a lateral bore for the reception of said pin.

LEO CASPAR STEINLE.
CEDRIC HAROLD HANWELL.